United States Patent
Song et al.

(10) Patent No.: US 10,937,141 B2
(45) Date of Patent: Mar. 2, 2021

(54) DEEP LEARNING BASED IMAGE COMPARISON DEVICE, METHOD AND COMPUTER PROGRAM STORED IN COMPUTER READABLE MEDIUM

(71) Applicant: SUALAB CO., LTD., Seoul (KR)

(72) Inventors: Kiyoung Song, Seoul (KR); Hyeong Shin Kang, Seoul (KR)

(73) Assignee: SUALAB CO., LTD., Seoul (KR)

( * ) Notice: Subject to any disclaimer, the term of this patent is extended or adjusted under 35 U.S.C. 154(b) by 270 days.

(21) Appl. No.: 16/313,867

(22) PCT Filed: Jul. 30, 2018

(86) PCT No.: PCT/KR2018/008617
§ 371 (c)(1),
(2) Date: Dec. 27, 2018

(87) PCT Pub. No.: WO2019/074195
PCT Pub. Date: Apr. 18, 2019

(65) Prior Publication Data
US 2020/0388021 A1      Dec. 10, 2020

(30) Foreign Application Priority Data

Oct. 13, 2017   (KR) ........................ 10-2017-0133452

(51) Int. Cl.
*G06T 7/00*         (2017.01)
*G06K 9/62*         (2006.01)
(Continued)

(52) U.S. Cl.
CPC .......... *G06T 7/0002* (2013.01); *G06K 9/6202* (2013.01); *G06N 3/0454* (2013.01);
(Continued)

(58) Field of Classification Search
CPC ..... G06T 7/001; G06T 7/0002; G06T 7/0006; G06T 7/0008; G06T 7/002; G06T 7/0004;
(Continued)

(56) References Cited

U.S. PATENT DOCUMENTS 6,115,509 A       9/2000  Yeskel
10,475,174 B2 *  11/2019  Lim .................... G06T 7/0004
(Continued)

FOREIGN PATENT DOCUMENTS

KR     10-0160215 B1    12/1998
KR     10-1563569 B1    10/2015
(Continued)

OTHER PUBLICATIONS

"A Siamese Autoencoder Preserving Distances for Anomaly Detection in Multi-Robot Systems"; Lev V. Utkin, 2017 International Conference on Control, Artificial Intelligence, Robotics & Optimization (Year: 2017).*

(Continued)

*Primary Examiner* — Michael S Osinski
(74) *Attorney, Agent, or Firm* — Seed IP Law Group LLP

(57) ABSTRACT

According to an exemplary embodiment of the present disclosure, an image comparing method is disclosed. The image comparing method includes: receiving, by a pre-learned network function, first image data and second image data having correlation; determining anomaly related information of the second image data based on the received first image data and second image data; and outputting the anomaly related information determined by the network function.

15 Claims, 14 Drawing Sheets

(51) Int. Cl.
*G06N 3/04* (2006.01)
*G06N 3/08* (2006.01)

(52) U.S. Cl.
CPC .... *G06N 3/084* (2013.01); *G06T 2207/20081* (2013.01); *G06T 2207/20084* (2013.01)

(58) Field of Classification Search
CPC . G06T 7/33; G06T 7/0012; G06T 7/11; G06T 7/194; G06T 7/35; G06T 7/0014; G06T 2207/20084; G06T 2207/20081; G06T 2207/10081; G06T 2207/10132; G06T 2207/30164; G06N 3/0454; G06N 3/084; G06N 3/08; G06N 3/0472; G06N 3/04; G06N 3/0445; G06N 3/0481; G06N 3/088; G06K 9/6202; G06K 9/6256; G06K 9/6262; G06K 9/627; G06K 9/4609; G06K 9/4671; G06K 9/66; G06K 9/36; G06K 9/46; G06K 2209/19; G06K 2209/23
See application file for complete search history.

(56) References Cited

U.S. PATENT DOCUMENTS

| | | | | |
|---|---|---|---|---|
| 10,691,977 | B2* | 6/2020 | Kim | G06K 9/46 |
| 10,692,050 | B2* | 6/2020 | Taliwal | G06K 9/6201 |
| 10,803,301 | B1* | 10/2020 | Farivar | G06K 9/6256 |
| 2016/0035093 | A1* | 2/2016 | Kateb | G02B 23/24 382/131 |
| 2016/0093050 | A1* | 3/2016 | Kim | G06K 9/46 382/128 |
| 2016/0300120 | A1* | 10/2016 | Haas | G06K 9/6206 |
| 2017/0169313 | A1 | 6/2017 | Choi et al. | |
| 2017/0177997 | A1* | 6/2017 | Karlinsky | G06K 9/6271 |
| 2017/0200264 | A1* | 7/2017 | Park | G01N 21/9501 |
| 2017/0293894 | A1* | 10/2017 | Taliwal | G06T 7/11 |
| 2017/0337682 | A1* | 11/2017 | Liao | G06T 7/30 |
| 2018/0182039 | A1* | 6/2018 | Wang | G06K 9/6268 |
| 2018/0204316 | A1* | 7/2018 | Kasahara | G06K 9/6256 |
| 2018/0211374 | A1* | 7/2018 | Tanaka | G06K 9/6269 |
| 2018/0268257 | A1* | 9/2018 | Ren | G06T 7/001 |
| 2018/0293734 | A1* | 10/2018 | Lim | G06K 9/627 |
| 2019/0066268 | A1* | 2/2019 | Song | G06N 3/0454 |
| 2019/0101605 | A1* | 4/2019 | Hyun | G01R 33/5611 |
| 2019/0125306 | A1* | 5/2019 | Oh | G16H 50/20 |
| 2019/0156474 | A1* | 5/2019 | Watanabe | G06T 7/001 |
| 2020/0293830 | A1* | 9/2020 | Liu | G06T 7/0004 |
| 2020/0294201 | A1* | 9/2020 | Planche | G06K 9/40 |
| 2020/0357153 | A1* | 11/2020 | Zhao | G06T 5/50 |

FOREIGN PATENT DOCUMENTS

| | | |
|---|---|---|
| KR | 10-1568590 B1 | 11/2015 |
| KR | 10-2017-0070715 A | 6/2017 |
| KR | 10-2017-0083805 A | 7/2017 |
| KR | 10-2017-0091716 A | 8/2017 |
| KR | 10-1769918 B1 | 8/2017 |
| KR | 10-1793510 B1 | 11/2017 |
| KR | 10-1831783 B1 | 2/2018 |

OTHER PUBLICATIONS

"A Novel Siamese-Based Approach for Scene Change Detection With Applications to Obstructed Routes in"; Marcos C. S. Santana, IEEE Intelligent Systems ( vol. 35, Issue: 1, Jan.-Feb. 1, 2020) (Year: 2019).*

Korean Notice of Allowance, dated Oct. 30, 2018, for Korean Application No. 10-2017-0133452, 2 pages. (With English Machine Translation).

Korean Office Action, dated Jun. 20, 2018, for Korean Application No. 10-2017-0133452, 9 pages. (With English Machine Translation).

International Search Report, dated Oct. 29, 2018, for International Application No. PCT/KR2018/008617, 3 pages.

Khan et al., "Learning deep structured network for weakly supervised change detection," *Proceedings of the Twenty-Sixth International Joint Conference on Artificial Intelligence (IJCAI-17)*, Melbourne, Australia, Aug. 19-25, 2017, pp. 2008-2015.

Noh et al., "Learning Deconvolution Network for Semantic Segmentation," *International Conference on Computer Vision (ICCV)*, IEEE, Santiago, Chile, Oct. 7-13, 2015, pp. 1520-1528.

* cited by examiner

DEEP LEARNING BASED IMAGE COMPARISON DEVICE, METHOD AND COMPUTER PROGRAM STORED IN COMPUTER READABLE MEDIUM

BACKGROUND

Technical Field

The present disclosure relates to image processing, and more particularly, to comparison of images based on deep learning.

Description of the Related Art

Deep learning may be defined as a set of machine learning algorithms attempting to achieve high-level abstraction (work of abstracting characteristics, core contents or functions among a large amount of data or complex materials) through a combination of several non-linear transformation methods, and is one field of machine learning, which teaches a way of thinking of a person to a computer. Deep learning is used in the whole industry together with artificial intelligence meaning intelligence created from a machine.

Korean Patent Application Laid-Open No. 10-2017-0083805 discloses a distinction method using a neural network for a character written in a cursive style.

BRIEF SUMMARY

Technical Problem

The present disclosure is conceived in response to the foregoing background art, and an object of the present disclosure is to provide an image processing solution based on deep learning.

Technical Solution

In order to achieve the foregoing objects, an exemplary embodiment of the present disclosure discloses a method of comparing an image. The method of comparing the image includes: receiving, by a pre-learned network function, first image data and second image data having correlation; determining anomaly related information of the second image data based on the received first image data and second image data; and outputting the anomaly related information determined by the network function.

In the alternative exemplary embodiment of the method, the network function may include: a first subnetwork, to which the first image data is input; and a second subnetwork, to which the second image data is input.

In the alternative exemplary embodiment of the method, the network function may further include a comparison module, which is connected with at least one of the first subnetwork and the second subnetwork in series.

In the alternative exemplary embodiment of the method, at least one of the first subnetworks, the second subnetwork, and the comparison module may have a deep neural network (DNN) structure.

In the alternative exemplary embodiment of the method, at least one of the first subnetwork and the second subnetwork may have a convolutional neural network (CNN) structure among the DNN structures.

In the alternative exemplary embodiment of the method, the comparison module may have a deconvolutional neural network (DCNN) structure among the DNN structures.

In the alternative exemplary embodiment of the method, the comparison module may form at least a part of a U network (U-net) structure with at least one of the first subnetwork and the second subnetwork.

In the alternative exemplary embodiment of the method, the first subnetwork and the second subnetwork may share one or more links having the same weight.

In the alternative exemplary embodiment of the method, the first subnetwork and the second subnetwork may form at least a part of a Siamese network.

In the alternative exemplary embodiment of the method, the determining of the anomaly related information may include: generating at least one element of layer comparison information based on at least one layer of the first subnetwork and at least one layer of the second subnetwork; and calculating the anomaly related information based on the generated layer comparison information.

In the alternative exemplary embodiment of the method, the calculating of the anomaly related information may include providing a corresponding layer of the comparison module with the generated layer comparison information.

In the alternative exemplary embodiment of the method, the corresponding layer may be determined based on a location of the layer of the first subnetwork or the layer of the second subnetwork, which is the basis for generating the layer comparison information.

In the alternative exemplary embodiment of the method, the first image data may be a master image including only normal state image data including no anomaly data, and the second image data may be a slave image.

In the alternative exemplary embodiment of the method, the anomaly related information may include data related to location information about a pixel, at which anomaly exists, in the second image data.

In the alternative exemplary embodiment of the method, the first image data and the second image data may have the same size.

Advantageous Effects

The present disclosure may provide an image processing solution based on deep learning.

BRIEF DESCRIPTION OF OF THE SEVERAL VIEWS OF THE DRAWINGS

DETAILED DESCRIPTION

Hereinafter, various exemplary embodiments are described with reference to the drawings. In the present specification, various descriptions are presented for understanding the present disclosure. However, it is apparent that the exemplary embodiments may be carried out without a particular description. In other examples, publicly known structures and devices are provided in the form of a block diagram for easily describing the exemplary embodiments.

Terms, "component", "module", "system" and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and the computing device may be components. One or more components may reside in a processor and/or an execution thread, and one component may be localized within one computer or may be distributed between two or more computers. Further, the components may be executed by various computer readable medium having various data structures stored therein. For example, components may communicate through local and/or remote processing according to a signal (for example, data transmitted to another system through a network, such as Internet, through data and/or a signal from one component interacting with another component in a local system and a distributed system) having one or more data packets.

Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

The descriptions of the presented exemplary embodiments are provided so that those skilled in the art may use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

Figure 1:
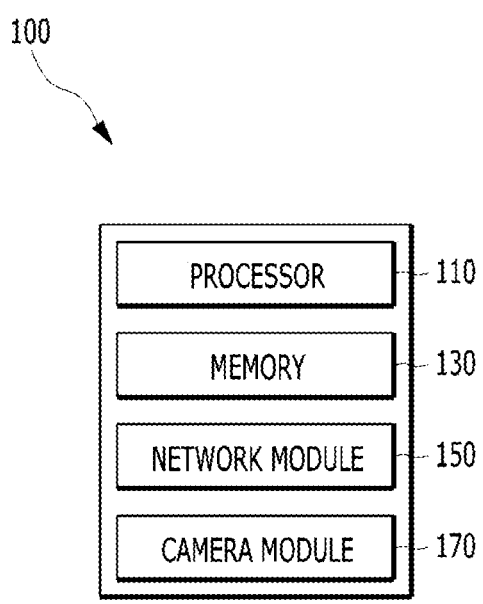
FIG. 1 is a block diagram illustrating a computing device performing an image comparison method according to an exemplary embodiment of the present disclosure.

FIG. 1 is a block diagram illustrating a computing device performing an image comparison method according to an exemplary embodiment of the present disclosure. The configuration of the computing device 100 illustrated in FIG. 1 is simply a simplified example, and in the exemplary embodiment of the present disclosure, the computing device 100 may include other configurations for establishing a computing environment of the computing device 100.

The computing device 100 may include a processor 110, a memory 130, a network module 150, and a camera module 170.

The processor 110 may be formed of one or more cores, and may include a processor, such as a central processing unit (CPU), a general purpose graphics processing unit (GPGPU), and a tensor processing unit (TPU) of the computing device, for analyzing data and deep learning. The processor 110 may read a computer program stored in the memory 130 and perform the image comparison method according to the exemplary embodiment of the present disclosure. According to the exemplary embodiment of the present disclosure, the processor 110 may perform calculation for learning of a neural network. The processor 110 may perform a calculation, such as processing of input data for learning in deep learning (DN), extraction of a feature from input data, an error calculation, updating of a weight of a neural network by using backpropagation, for learning of a neural network. At least one of the CPU, GPGPU, and the TPU of the processor 110 may process learning of a network function. For example, the CPU and the GPGPU may process learning of a network function and data classification by using the network function together. Further, in the exemplary embodiment of the present disclosure, learning of a network function and data classification by using the network function may be processed by using processors of the plurality of computing devices together. Further, the computer program executed in the computing device according to the exemplary embodiment of the present disclosure may be a CPU, GPGPU, or TPU executable program.

The computing device 100 in the exemplary embodiment of the present disclosure may distribute and process a network function by using at least one of the CPU, the GPGPU, and the TPU. Further, in the exemplary embodiment of the present disclosure, the computing device 100 may distribute and process a network function together with another computing device.

In the exemplary embodiment of the present disclosure, an image processed by using a network function may be an image stored in a storage medium of the computing device 100, an image photographed by a camera module 170 of the computing device 100, and/or an image transmitted from another computing device, such as an image database, by a network module 150. Further, in the exemplary embodiment of the present disclosure, the image processed by using a network function may be an image stored in a computer readable storage medium (for example, a flash memory and the like may be included, but the present disclosure is not limited thereto). The computing device 100 may receive the image file stored in the computer readable storage medium through an input/output interface (not illustrated).

The memory 130 may store a computer program for performing the image comparison method according to the exemplary embodiment of the present disclosure, and the stored computer program may be read and driven by the processor 110.

The network module 150 may transceive data and the like for performing the image comparison method according to the exemplary embodiment of the present disclosure with another computing device, a server, and the like. The network module 150 may transceive data, such as image data, required for the exemplary embodiment of the present disclosure with another computing device, a server, and the like. For example, the network module 150 may receive learning image data from a learning image database and the like. Further, the network module 150 may enable the plurality of computing devices to communicate with one another to make the learning of a network function be distributed and performed, and make data classification using a network function be distributed and processed in each of the plurality of computing devices.

The camera module 170 may photograph a target for examination and generate image data for performing the image comparison method according to the exemplary embodiment of the present disclosure. In the exemplary embodiment of the present disclosure, the computing device 100 may include one or more camera modules 170.

Figure 2:
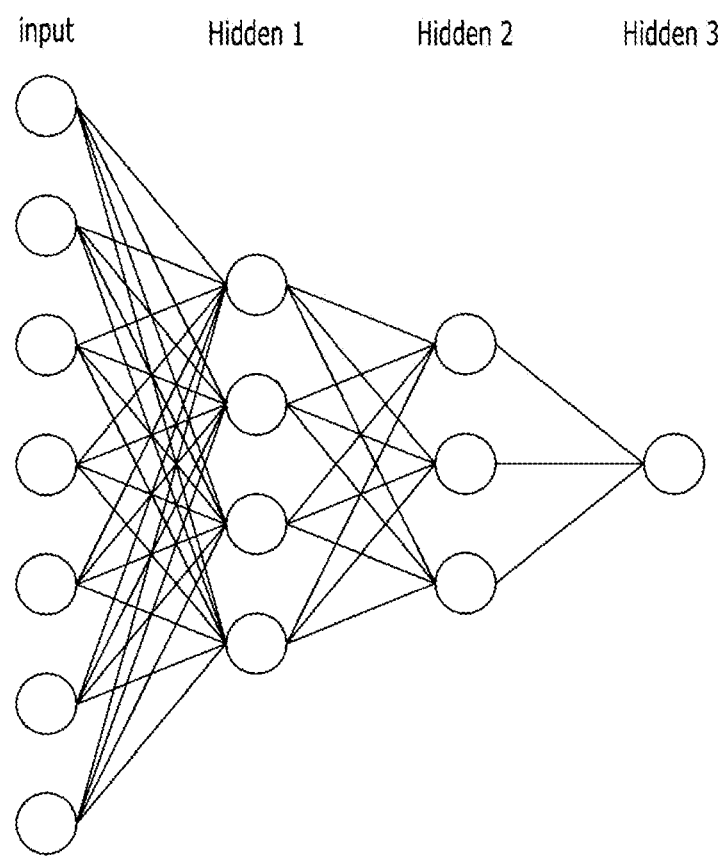
FIG. 2 is a schematic diagram illustrating a part of an artificial neural network according to the exemplary embodiment of the present disclosure.

FIG. 2 is a schematic diagram illustrating a part of an artificial neural network according to the exemplary embodiment of the present disclosure.

Throughout the present specification, a nerve network, a network function and a neural network may be used as the same meaning. The neural network may be formed of a set of connected calculation units, which may be generally called "nodes". The "nodes" may also be called "neurons". The neural network includes one or more nodes. The nodes (or neurons) forming the neural networks may be connected with each other by one or more "links".

In the neural network, one or more nodes connected through the link may form a relative relationship of an input node and an output node. The concept of the input node is relative to the concept of the output node, and a predetermined node having an output node relationship with respect to one node may have an input node relationship in a relationship with another node, and a reverse relationship may also be valid. As described above, the relationship between the input node and the output node may be generated based on the link. One or more output nodes may be connected to one input node through a link, and a reverse case may also be valid.

In the relationship between an input node and an output node connected through one link, a value of the output node may be determined based on data input to the input node. Herein, a node connecting the input node and the output node may have a weight. A weight may be variable, and may be varied by a user or an algorithm in order to perform a function desired by a neural network. For example, when one or more input nodes are connected to one output node by links, respectively, a value of the output node may be determined based on values input to the input nodes connected with the output node and a weight set in the link corresponding to each of the input nodes.

As described above, in the neural network, one or more nodes are connected with one another through one or more links and form a relationship of an input node and an output node within the neural network. A characteristic of the neural network may be determined according to the number of nodes and links, a relation between the nodes and the links, and a value of a weight assigned to each of the link within the neural network. For example, when there are two neural networks, which have the same number of nodes and the same number of links and have different weight values between the links, the two neural networks may be recognized to be different from each other.

As illustrated in FIG. 2, the neural network may include one or more nodes. Some of the nodes forming the neural network may form one layer based on distances from an initial input node. For example, a set of nodes having a distance of n from an initial input node may form n layers. The distance from the initial input node may be defined by the minimum number of links, which needs to be passed from the initial input node to a corresponding node. However, the definition of the layer is arbitrary for illustration and a degree of layer within the neural network may be defined by a different method from the foregoing method. For example, the layers of the nodes may be defined by a distance from a final output node.

The initial input node may mean one or more nodes, to which data is directly input without passing a link in a relationship with other nodes among the nodes within the neural network. Further, the initial input node may mean nodes having no other input node connected through the links in a relationship between the nodes based on a link within the neural network. Similarly, the final output node may mean one or more nodes having no output node in the relationship with other nodes among the nodes within the neural network. Further, a hidden node may mean a node, not the initial input node and the final output node, forming the neural network. In the illustration of FIG. 2, the output node is omitted. The neural network according to the exemplary embodiment of the present disclosure may be a neural network in the form, in which the number of nodes of an input layer may be larger than the number of nodes of a hidden layer close to an output node, and the number of nodes is decreased according to the progress from the input layer to the hidden layer.

A deep neural network (DNN) may mean a neural network including a plurality of hidden layers, in addition to an input layer and an output layer. When the DNN is used, it is possible to recognize a latent structure of data. That is, it is possible to recognize a latent structure (for example, the kind of object included in a picture, contents and emotion included in writing, contents and emotion included in a voice, and the like) of a picture, writing, a video, a voice, and music. The DNN may include a convolutional neural network (CNN), a recurrent neural network (RNN), a restricted Boltzmann machine (RBM), a deep belief network (DBN), a Q network, a U network Siamese network, and the like.

Figure 3:
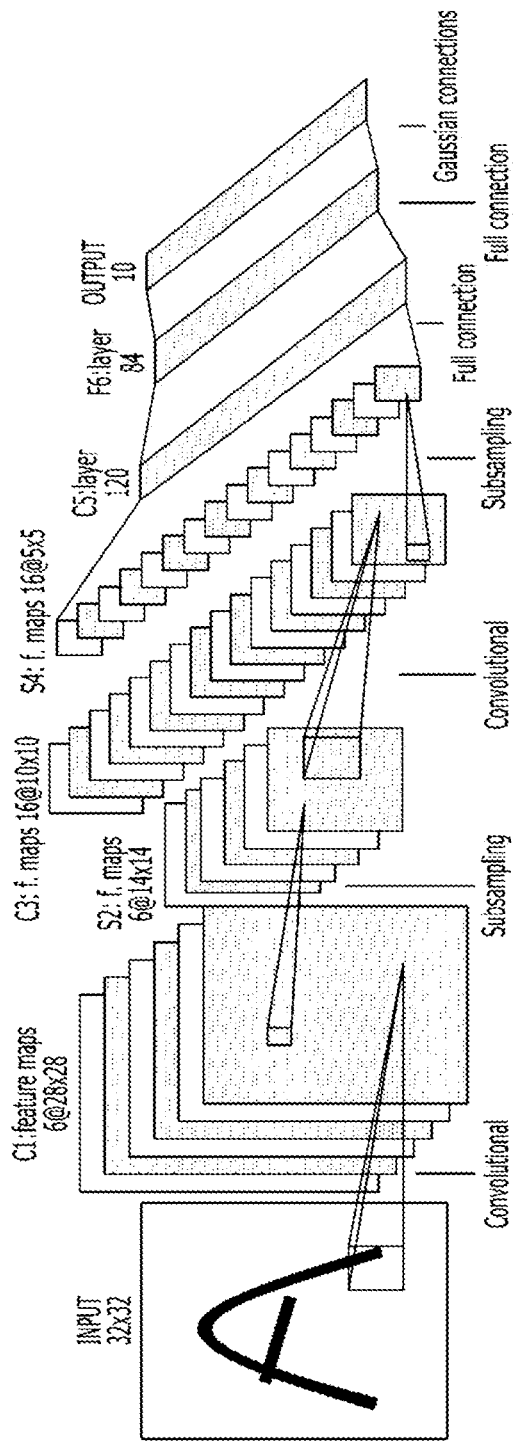
FIG. 3 is a schematic diagram illustrating a convolutional neural network according to the exemplary embodiment of the present disclosure.

The CNN illustrated in FIG. 3 is a sort of the DNN, and includes a neural network including a convolutional layer. The CNN is one kind of multilayer perceptorns designed to use a minimum preprocess. The CNN may be formed of one or several convolutional layers and artificial neural network layers combined with the convolutional layers, and may additionally utilize a weight and pooling layers. By the structure, the CNN may efficiently utilize input data having a 2D structure. The CNN may be used for recognizing an object in an image. The CNN may represent image data with a matrix having a dimension and process the image data. For example, in the case of image data encoded with red-green-blue (RBG), the image data may be represented with a 2D matrix (for example, in the case of a 2D image) for each color of R, G, and B. That is, a color value of each pixel of the image data may be a component of the matrix, and a size of the matrix may be the same as a size of the image. Accordingly, the image data may be represented with three 2D matrixes (a 3D data array).

A convolutional process (an input/output of the convolutional layer) may be performed by multiplying a convolutional filter and a matrix component at each position of the image while shifting the convolutional filter in the CNN. The convolutional filter may be formed of a matrix of n×n, and in general, the convolutional filter may be formed of a fixed filter including the smaller number of pixels than the entire number of pixels of the image. That is, when an m×m image is input to a convolutional layer (for example, a convolutional layer, in which a size of a convolutional filter is n×n), a matrix representing n×n pixels including each pixel of the image may be a multiplication of the convolutional filter and a component (that is, a multiplication of components of the matrix). A component matched with the convolutional filter may be extracted from the image by the multiplication with the convolutional filter. For example, the 3×3 convolutional filter for extracting a vertical straight component from the image may be formed as [[0,1,0],[0,1,0],[0,1,0]], and when the convolutional filter is applied to the input image, the vertical straight component matched with the convolutional filter is extracted from the image and may be output. The convolutional layer may apply the convolutional filter to each of the matrixes (that is, in the case of the RGB coded image, R, G, and B colors) for the channels representing the image. The convolutional layer may extract a feature matched with the convolutional filter from the input image by applying the convolutional filter to the input image. A filter value (that is, a value of each component of the matrix) of the convolutional filter may be updated by back propagation during a learning process of the CNN.

A sub sampling layer is connected to the output of the convolutional layer, so that it is possible to simplify the output of the convolutional layer and decrease the use amount of memory and the amount of calculation. For example, when the output of the convolutional layer is input to the pooling layer including a 2×2 max pooling filter, a maximum value included in each patch may be output for each 2×2 patch in each pixel of an image and an image may be compressed. The foregoing pooling may be a scheme of outputting a minimum value in the patch or outputting an average value of the patch, and a predetermined pooling scheme may be included in the present disclosure.

The CNN may include one or more convolutional layers and sub sampling layers. The CNN may extract a feature from an image by repeatedly performing a convolutional process and a sub sampling process (for example, the foregoing max pooling and the like). The neural network may extract a global feature of the image through the repeated convolutional process and sub sampling process.

The output of the convolutional layer or the sub sampling layer may be input to a fully connected layer. The fully connected layer is a layer, in which all of the neurons included in one layer are connected with all of the neurons included in an adjacent layer. The fully connected layer may mean a structure, in which all of the nodes of each layer are connected with all of the nodes of another layer in the neural network.

In the exemplary embodiment of the present disclosure, in order to perform segmentation of image data, the neural network may include a deconvolutional neural network (DCNN). The DCNN may perform an operation similar to the calculation of the CNN in a reverse direction, and may output a feature extracted by the CNN to a feature map related to original data.

Figure 4:
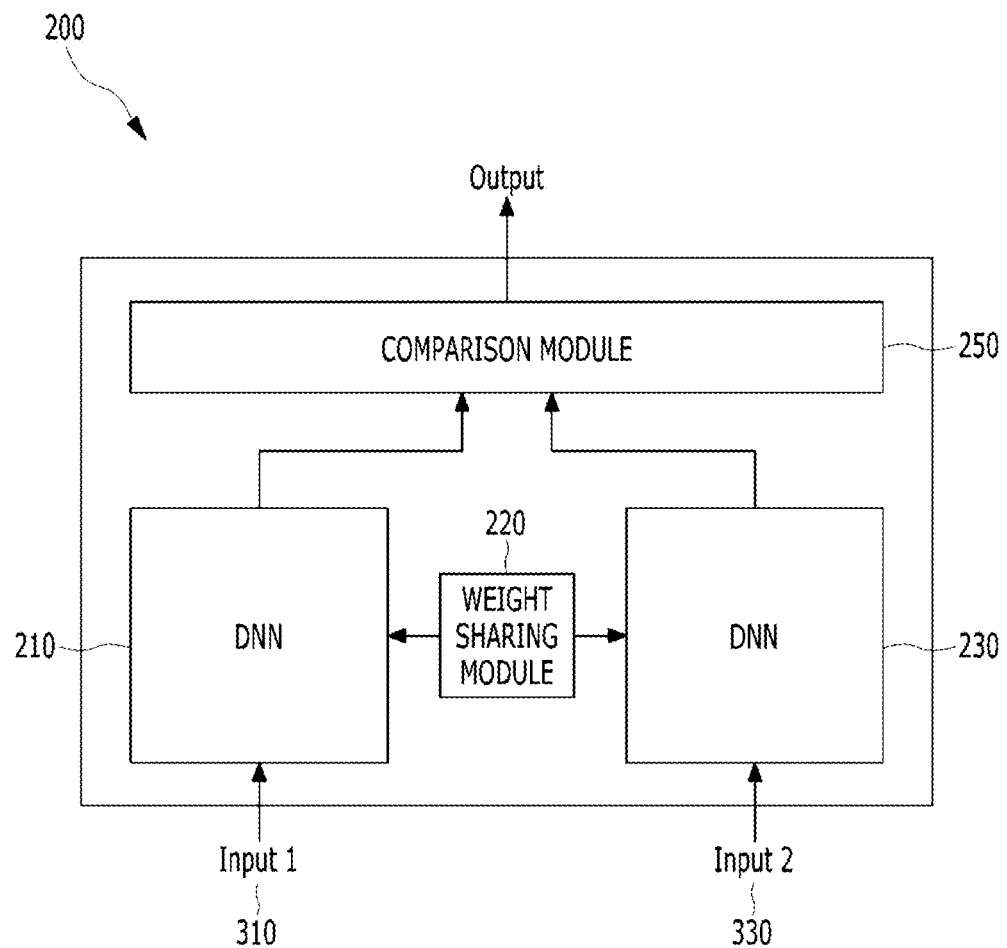
FIG. 4 is a diagram illustrating a Siamese network according to the exemplary embodiment of the present disclosure.

FIG. 4 is a diagram illustrating a Siamese network according to the exemplary embodiment of the present disclosure.

A Siamese network 200 is a neural network usable in a recognizer, in which training data for each category is not sufficient. The Siamese network may learn similarity measurement from data. The Siamese network may include two or more neural networks 210 and 230 (subnetworks) partially sharing a weight at least, and a comparison module 250 receiving outputs from the neural networks, as illustrated in FIG. 4. At least two images may be input to the Siamese network 200. The Siamese network 200 may output a result of the determination of similarity of the two input images. In order to process the image, the Siamese network may include two CNNs receiving an image. The two CNNs receiving the image in the Siamese network may share at least a part of a weight. Subnetworks included in the Siamese network may share a weight by a weight sharing module 220, and the subnetwork share the weight, so that the Siamese network may extract features by using a common weight of two elements of input data and compare the features.

The Siamese network structure is a learning possible network structure, which is capable of measuring similarity of input data, and may be used in the case where the number of categories is large and data for training is not sufficient. The learning method of the similarity measurement of input data may include a process of finding a function of mapping an input pattern to a target space so that a simple distance in the target space is close to a semantic distance in an input space.

The learning method of the similarity measurement of input data of the Siamese network may include a process of calculating a weight w in a function $G_w(X)$ having the weight w of a subnetwork. Particularly, in the case of a category, in which input data $X_1$ and $X_2$ are the same in the function $G_w(X)$ of the subnetwork, a similarity function $E_w(X_1, X_2) = \|G_w(X_1) - G_w(X_2)\|$ has a small value, and in the case of a category, in which input data X, and $X_2$ are different from each other, the learning method may include a process of calculating a weight w so that the similarity function has a large value. The weight w of the subnetwork may be shared by the weight sharing module 220. In the Siamese network structure, the subnetwork may process each input data with the function $G_w(X)$ having the shared weight.

In the two CNNs, the corresponding nodes may share the weight. Similarity of the features output from the CNN may be compared by the comparison module 250. In this case, the comparison may be performed based on mathematical distances of the features output from both CNNs. By the scheme of comparing both images, the Siamese network 200 may recognize an object and the like in image data even when training data is not sufficient, and is not sensitive to rotation, transformation, and the like of the image data, so that the Siamese network 200 may have general recognition performance.

The neural network may be learned by at least one scheme of supervised learning, unsupervised learning, and semi-supervised learning. The learning of the neural network is for the purpose of minimizing an error of an output. In the learning of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. The calculated error is back-propagated in a reverse direction (that is, the direction from the output layer to the input layer) in the neural network, and a connection weight of each of the nodes of the layers of the neural network may be updated according to the backpropagation. A variation rate of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the learning of the neural network, the training data may be generally a subset of actual data (that is, data to be processed by using the learned neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. The overfitting may act a reason of increasing an error of a machine learning algorithm. In order to prevent the overfitting, various optimizing methods may be used. In order to prevent the overfitting, a method of increasing training data, a regularization method, a dropout method of omitting a part of nodes of the network during the learning process, and the like may be applied.

Figure 5:
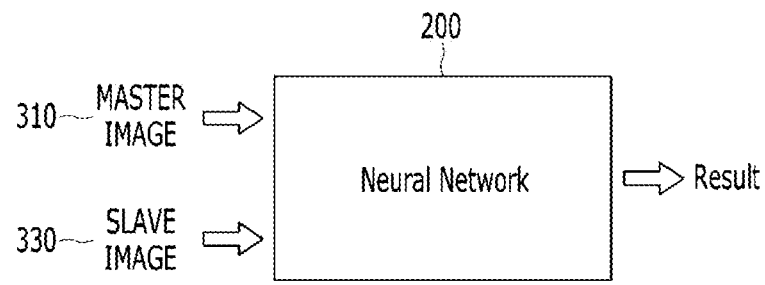
FIG. 5 is a concept diagram illustrating a simplified image comparison method according to the exemplary embodiment of the present disclosure.

FIG. 5 is a concept diagram illustrating a simplified image comparison method according to the exemplary embodiment of the present disclosure.

The image comparison method of the present disclosure may be performed by one or more processors 110 of the computing device 100. The one or more processors 110 of the computing device 100 of the present disclosure may perform a calculation process of the neural network of the present disclosure. All of the calculation processes (that is, the neural network learning, the extraction of the feature, the comparison of the feature, and the like) of the image comparison method of the present disclosure may be performed by the processor of the computing device 100. That is, the expression that the neural network processes data may mean a process of executing, by the processor 110 of the computing device 100, the neural network and processing data.

The computing device 100 in the image comparison method of the present disclosure may input a master image 310 and a slave image 330 to the neural network 200, and output a result based on a result of the calculation of similarity of the two images calculated by the neural network 200.

The neural network of the present disclosure may be used for classifying data. For example, the neural network of the present disclosure may be used for anomaly detection.

Anomaly data may mean abnormal data deviating from a normal pattern of data. Data may have an atypical pattern, and anomaly data may mean data deviating from the atypical pattern. For example, data for an image of a produced product in a production process may have an atypical pattern that is a normal product, and anomaly data may be data (that is, for example, an image of a defective product and the like) deviating from the atypical pattern that is the normal product. The descriptions of the normal data, the atypical pattern, and the anomaly data of the present disclosure are simply examples, and the present disclosure is not limited thereto.

More particularly, the neural network of the present disclosure may be used for classifying an anomaly product and a normal product in a production process. Further, the neural network of the present disclosure may be used for image segmentation. The image segmentation may mean a process of separating an image so that a part of the image is discriminated from another part of the image. The image segmentation may include, for example, a process of separating an image so that a part of the image is discriminated from another part of the image based on an edge, a color, and the like extracted from the image. Further, the image segmentation may be a process of extracting location information about an anomaly part from an image and identifying a location of anomaly data from another part of the image. Further, the image segmentation may also include a process of visualizing and displaying a part of an image discriminated from another part. For example, the neural network of the present disclosure may be used for displaying the anomaly part in the image.

The master image 310 is an image that is a basis of the determination of anomaly of input data. The slave image 330 is an image that is a target for determination of anomaly. In the present disclosure, the anomaly data may be abnormal data deviating from a normal pattern of data. The master image 310 may be an image including only normal state image data, not anomaly data. The slave image 330 may have a normal pattern and may also be abnormal data, and may be a target image of which anomaly is determined by the neural network. For example, the master image 310 may be an image of a normal product, and the slave image 330 may be an image of a product to be examined.

The images input to the neural network 200 may have the same size. Further, the image input to the neural network may be separated into patches having a predetermined size in order to make processing of the neural network easy and improve accuracy of the classification by overlapping the patches. For example, each of the master image 310 and the slave image 330 may be an image having a pixel size of 256×256, and may be separated into patches having a pixel size of 32×32 to be input to a subnetwork of the neural network 200. The extraction of the patch of the image may be performed on each pixel of the image, and each patch may have an overlapping portion. For example, when a patch having a pixel size of 32×32 is extracted from the leftmost and upper pixel of the image, a patch having a pixel size of 32×32 is extracted from a pixel adjacent to a right side in the corresponding pixel, each patch may have an overlapping portion.

The computing device 100 may extract a feature from each of the master image 310 and the slave image 330 input to the neural network 200. The computing device 100 may compare the respective features and determine similarity of the master image 310 and the slave image 330. The computing device 100 may determine similarity by calculating a mathematical distance between the feature of the master image 310 and the feature of the slave image 330. For example, when the similarity of the master image 310 and the slave image 330 is equal to or smaller than a predetermined threshold value, the computing device 100 may determine the slave image 330 as an image including anomaly data. Further, the computing device 100 may compare the feature of the master image 310 and the feature of the slave image 330 through the DNN, and generate a pixel by pixel segmentation output, which expresses actually different pixels in the two images by the unit of a pixel. The computing device 100 may compare outputs of the subnetwork through a predetermined comparison algorithm. The computing device 100 may output the degree of difference between both features, a location of a pixel of a part having the difference, and the like by using the neural network in the comparison of both features, as well as the simple comparison of the difference between both features.

Figure 6:
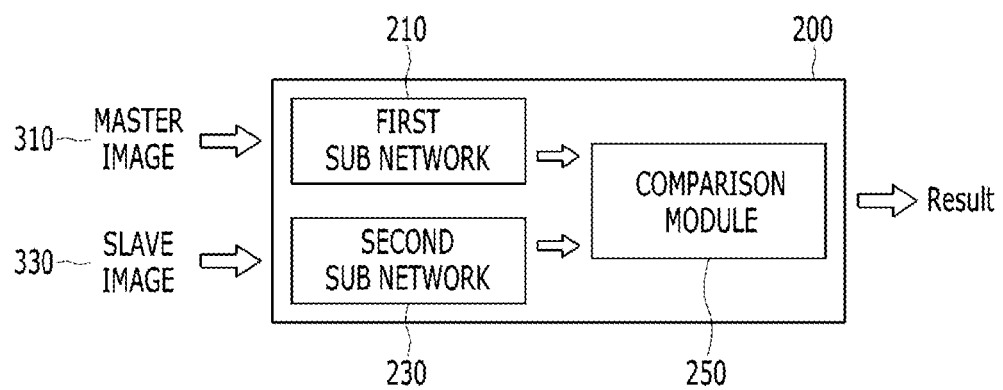
FIG. 6 is a diagram illustrating an example of a configuration of a neural network for implementing the image comparison method according to the exemplary embodiment of the present disclosure.

FIG. 6 is a diagram illustrating an example of a configuration of the neural network for implementing the image comparison method according to the exemplary embodiment of the present disclosure.

FIG. 6 is an example diagram illustrating the schematic diagram of FIG. 5 in more detail.

The master image 310 and the slave image 330 may be input to the subnetworks 210 and 310 of the neural network 200, respectively. The computing device 100 may calculate the images input by using the subnetworks 210 and 230 and extract features of the input images. The subnetworks 210 and 230 may form at least a part of the Siamese network. The subnetworks 210 and 230 may share at least parts of weights with each other and enable the comparison module 250 to extract features of the master image 310 and the slave image 330 with the common weight and compare the features. Herein, the subnetworks 210 and 230 may include the DNN structures. For example, at least one of the networks 210 and 230 may have a CNN structure, but the present disclosure is not limited thereto.

The comparison module 250 may have a CNN or a predetermined comparison algorithm structure. When the image comparison method of the present disclosure outputs location information about a pixel in an anomaly portion existing in the slave image 330, the comparison module 250 may have a DNN structure. When the comparison method of the present disclosure outputs whether an anomaly portion exists in the slave image 330, the comparison module 250 may be formed of a mathematical comparison algorithm.

The comparison module 250 may be connected with each of the subnetworks 210 and 230 in series. Herein, the connection in series may mean that at least a part of an output of the subnetwork may be an input of the comparison module 250 or a part of the subnetwork may overlap the comparison module 250. The comparison module 250 may have a configuration of comparing the plurality of images, and features of the image, and may compare the features output from the subnetworks and generate comparison information. The comparison module 250 may also have the form of a function of comparing mathematical distances of two features, and may also have a configuration, which is formed of a DNN and determines similarity of two features. When the comparison module 250 is formed of a DNN, the comparison module 250 may calculate features related to similarity of an image from data received from the first subnetwork 210 and the second subnetwork 230. The comparison module 250 may compare the features extracted from the subnetworks by a predetermined data comparison algorithm, and the present disclosure is not limited to the comparison algorithm. The comparison module 250 may have a DNN structure, and may include a DCNN structure among the DNN structures.

Figure 7:
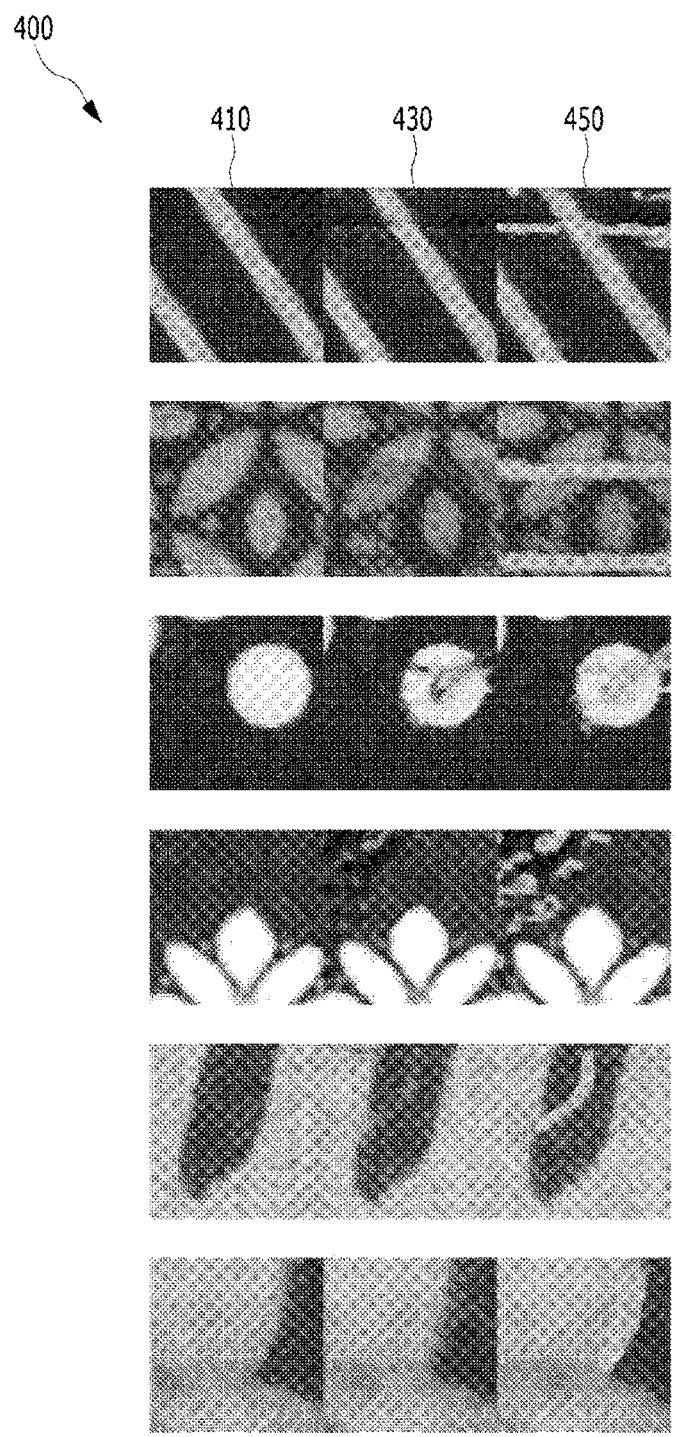
FIG. 7 is an example of training data of the neural network for implementing the image comparison method according to the exemplary embodiment of the present disclosure.

Based on a result of the comparison of the comparison module 250, the neural network 200 may output anomaly related information. The anomaly related information may include information indicating whether the image includes anomaly data, or location information about a pixel, at which anomaly exists, when the image includes anomaly data. The labelling image 450 of FIG. 7 is an image displayed by visualizing location information about a pixel, at which anomaly exists. The location information about the pixel, at which the anomaly exists in the image, may be displayed in an overlapping shape in a portion, in which the anomaly exists, and visualized. In another exemplary embodiment, the location information about the pixel, at which the anomaly exists, may include information, which is capable of specifying a contour of a data region, in which the anomaly exists. The present disclosure includes a predetermined method for displaying a portion in an image, in which the anomaly exists.

FIG. 7 is an example of training data of the neural network for implementing the image comparison method according to the exemplary embodiment of the present disclosure.

The training data 400 of the neural network for implementing the image comparison method according to the exemplary embodiment of the present disclosure may include a normal image 410, a target image 430, and a labelling image 450. The normal image 410 is an image serving as a basis of the determination of anomaly of input data, and may be an image including only normal state image data, which does not include anomaly data. The normal image 410 may correspond to the master image 310 of the neural network after the learning. That is, for example, the normal image 410 may be an image, which has only an atypical pattern of a normal product and does not have anomaly. The target image 430 is an image subjected to the determination of anomaly, and may be an image including anomaly data. The target image 430 may correspond to the slave image 330 of the neural network after the learning. The labelling image 450 is an image labelled with a pixel, at which anomaly exists, in the target image 430. The image illustrated in FIG. 7 is a product image related to a fiber processed field, but the present disclosure is not limited thereto.

Figure 8:
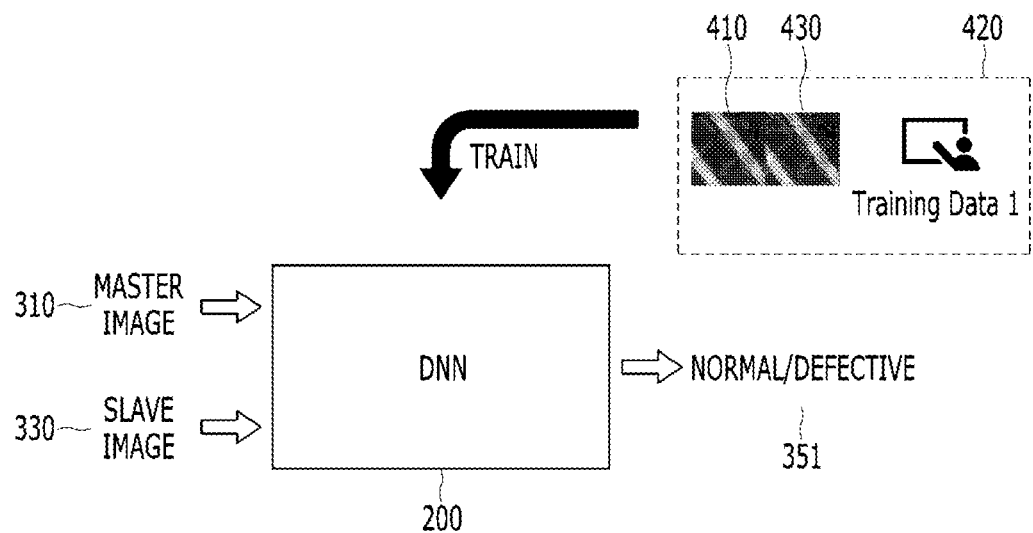
FIG. 8 is a concept diagram illustrating a neural network learning scheme for implementing the image comparison method according to the exemplary embodiment of the present disclosure.
Figure 9:
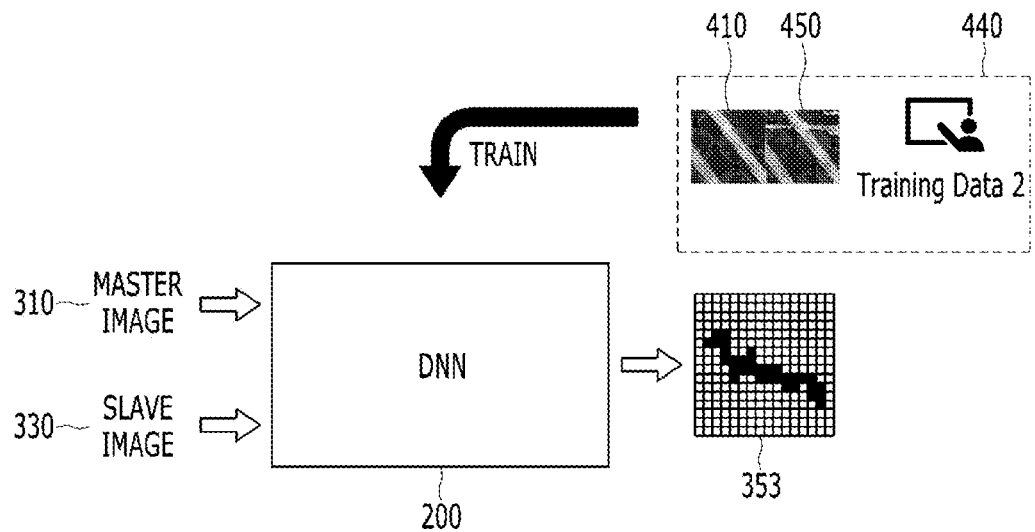
FIG. 9 is a concept diagram illustrating a neural network learning scheme for implementing an image comparison method according to another exemplary embodiment of the present disclosure.
Figure 10:
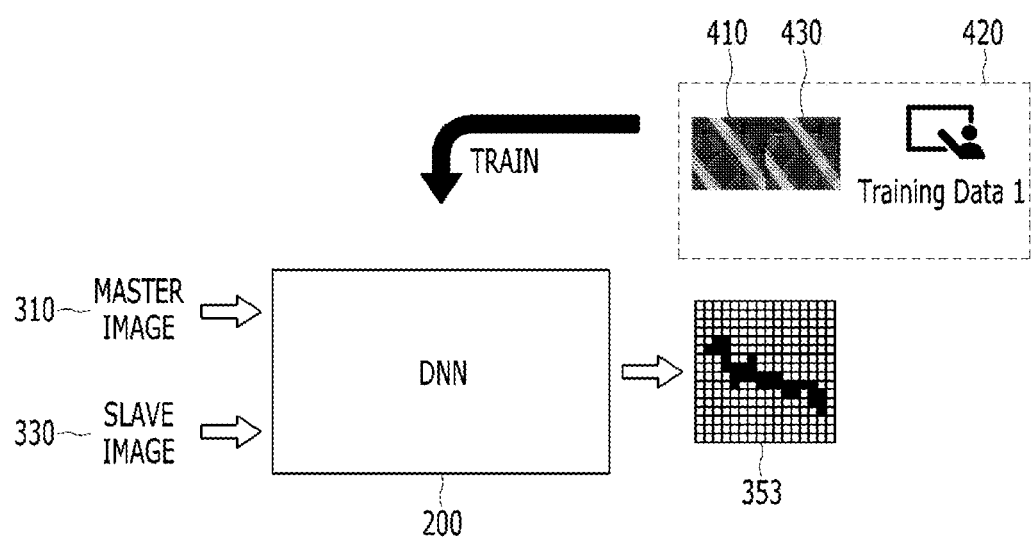
FIG. 10 is a concept diagram illustrating a neural network learning scheme for implementing an image comparison method according to still another exemplary embodiment of the present disclosure.

FIGS. 8 to 10 are conceptual diagrams illustrating the neural network learning scheme for implementing the image comparison method according to the exemplary embodiment of the present disclosure.

As illustrated in FIG. 8, the neural network 200 in the exemplary embodiment of the present disclosure may learn the normal image 410 and the target image 430 as the training data 420 (that is, the data labelled with whether anomaly exists) and be learned so as to determine whether input data includes anomaly data. Herein, the target image 430 may be an image labelled with whether anomaly exists. That is, in the learning scheme of FIG. 8, the normal image 410 and the target image 430 may be input to the neural network 200, and the neural network 200 may output an output 351 relating to whether the target image 430 includes anomaly data. The comparing device 100 may compare an output of the neural network and the information indicating whether the labelled anomaly data exists in the target image 430, calculate an error, and back-propagate the error to train the neural network 200 so as to classify whether the anomaly data exists in the slave image 330. That is, the computing device 100 may train the neural network 200 so as to output the output 351 related to whether the anomaly data exists by using the training data 420 labelled with whether the anomaly data exists.

As illustrated in FIG. 9, a neural network 200 in another exemplary embodiment of the present disclosure may learn a normal image 410 and a labelling image 450 as training data 440 (that is, normal data and an abnormal image labelled with a pixel, at which the anomaly exists), and be trained so as to output an output 353 related to location information about the pixel, at which the anomaly exists, in input data. Herein, the labelling image 450 may be data labelled with the location information about the pixel, at which the anomaly exists, in the image as described above. That is, in a learning scheme illustrated in FIG. 9, the normal image 410 and the labelling image 450 may be input to the neural network 200, and the neural network 200 may output data related to the location information about the pixel, at which the anomaly exists, in the labelling image 450. The computing device 100 may compare an output of the neural network and the data related to the location information about the pixel, at which the anomaly exists, labelled to the labelling image 450, calculate an error, and back-propagate the error to train the neural network 200 so as to output the data related to the location information about the pixel, at which the anomaly exists, in the slave image 330. That is, the computing device 100 may train the neural network 200 so as to output an output 353 related to the location information about the pixel, at which the anomaly exists, in the image data by using the training data 440 labelled with the location information about the pixel, at which the anomaly exists, in the image data.

As illustrated in FIG. 10, a neural network 200 in still another exemplary embodiment of the present disclosure may learn a normal image 410 and a target image 430 as training data 420 and be trained so as to output an output 353 related to location information about a pixel, at which the anomaly exists, in input data. That is, in the learning scheme illustrated in FIG. 10, the normal image 410 and the target image 430 are input to the neural network 200, and the neural network 200 may output data related to the location information about the pixel, at which the anomaly exists, in the target image 430. The computing device 100 may compare an output of the neural network and a target (for example, whether the anomaly labelled to the target image 430 exists), calculate an error, and back-propagate the error to train the neural network 200 so as to output the data related to the location information about the pixel, at which the anomaly exists, in the slave image 330. That is, the computing device 100 may train the neural network 200 so as to output an output 353 related to the location information about the pixel, at which the anomaly exists, in the image data by using the training data 420 labelled with whether anomaly data exists.

Figure 11:
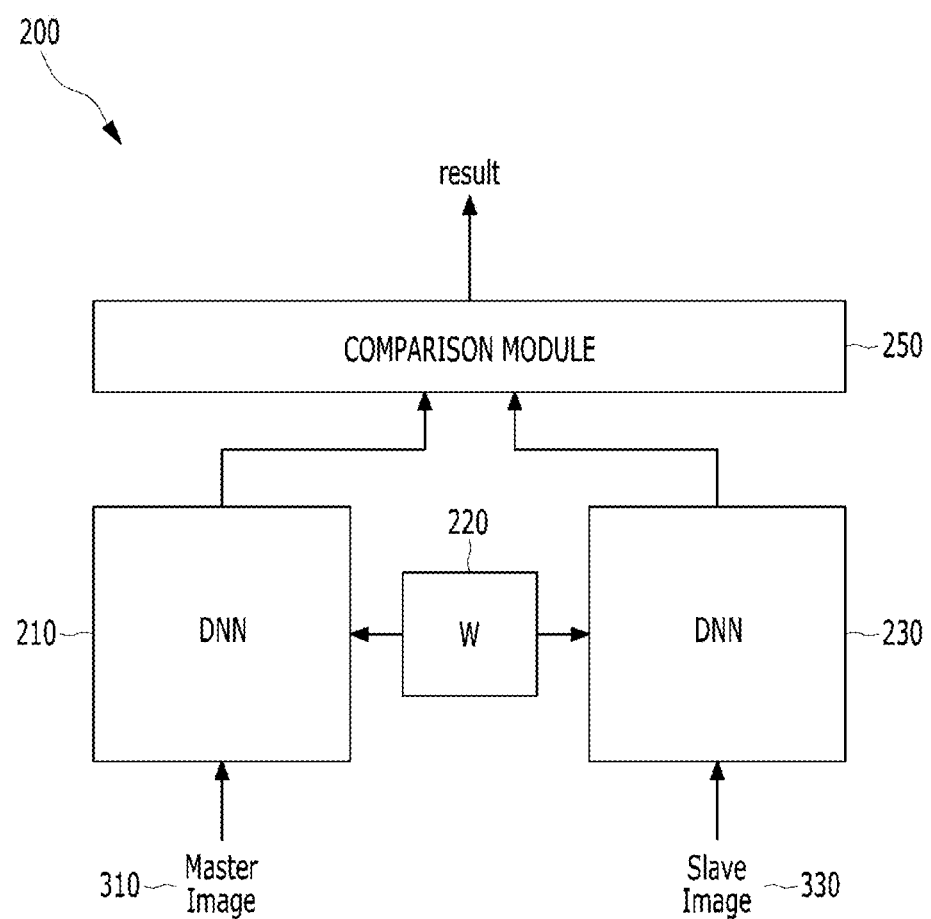
FIG. 11 is a diagram illustrating a configuration of a network for implementing the image comparison method according to the exemplary embodiment of the present disclosure.

FIG. 11 is a diagram illustrating the structure of the neural network 200 of FIG. 6 in more detail.

FIG. 11 is a diagram illustrating the Siamese network for implementing the image comparison method according to the exemplary embodiment of the present disclosure. The Siamese network 200 may form the neural network 200 of FIG. 6. At least one of the subnetworks 210 and 230 may include a CNN structure. The subnetworks 210 and 230 may share one or more weights by the weight sharing module 220. The weight sharing module 220 may have a structure connecting the subnetworks 210 and 230 so that the two subnetworks 210 and 230 may share one or more weights. The comparison module 250 may include a convolutional network structure. The subnetworks 210 and 230 may share at least apart of the weight. Accordingly, the subnetworks 210 and 230 may extract features with a common weight for the master image 310 and the slave image 330 to enable the comparison module 250 to compare the features.

The comparison module 250 may form at least a part of a U network structure with at least one of the subnetworks. A U network 500 will be described with reference to FIG. 12. The entirety or a part of the subnetworks 210 and 230 and the entirety or a part of the comparison module 250 may form the U network. Further, the combination of the subnetworks 210 and 230 and the comparison module 250 may also be a part of the U network.

Figure 12:
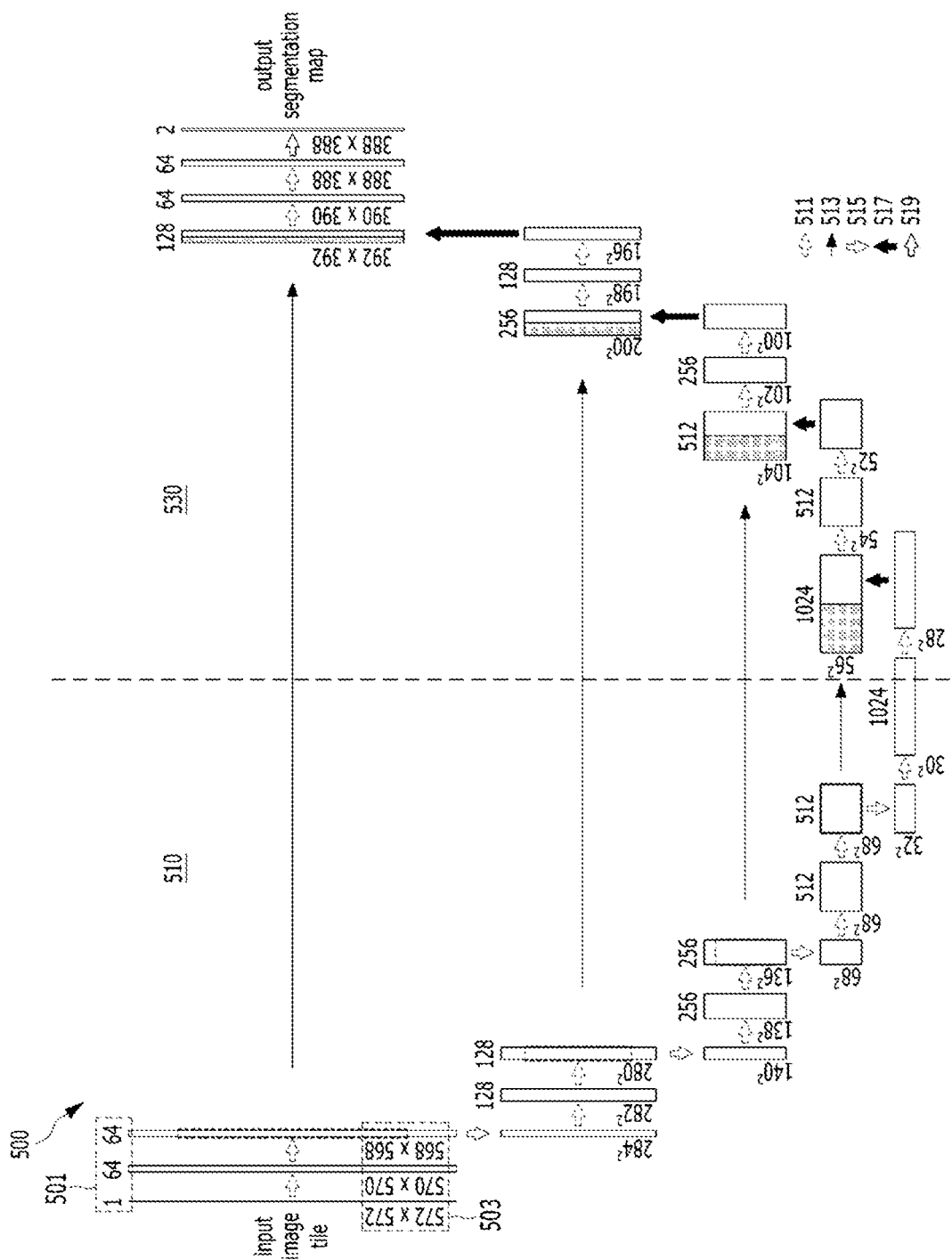
FIG. 12 is a diagram of an example of a U network for implementing the image comparison method according to the exemplary embodiment of the present disclosure.

The U network 500 may have a DNN structure, which is capable of performing image segmentation. A left part of the U network illustrated in FIG. 12 may have a DNN structure, which is capable of decreasing a dimension of input data, and a right part of the U network may have a DNN structure, which is capable of increasing a dimension of input data. More particularly, a dimension decreasing network 510 of the U network 500 may have a CNN structure, and a dimension increasing network 530 of the U network 500 may have a DCNN structure. A part illustrated with a rectangle in FIG. 12 may be each layer of the U network. In the illustration of FIG. 12, a number of a part 501 of each layer may be an example of the number of channels of each layer. In the illustration of FIG. 12, a number of a part 503 of each layer may mean the illustrative number of pixels of an image processed in each layer, and the example of the number of pixels of the image is decreased and then increased in a direction of an arrow of the calculation of the U network illustrated in FIG. 12, so that it can be confirmed that the dimension of the image is decreased and then increased again. Arrow 511 illustrated in FIG. 12 may mean a convolutional operation of applying the convolutional filter to the image. For example, arrow 511 may be the convolutional operation of applying the 3×3 convolutional filter to the image, but the present disclosure is not limited thereto. Arrow 513 illustrated in FIG. 12 may indicate an operation of transmitting information required for increasing the dimension of the dimension-decreased image from the dimension decreasing network 510 to the corresponding dimension increasing network 530. Arrow 515 illustrated in FIG. 12 may mean a pooling operation for decreasing the pixel of the image. For example, arrow 515 may be max pooling of extracting a maximum value, but the present disclosure is not limited thereto. Arrow 517 illustrated in FIG. 12 may mean a convolutional operation of increasing the dimension of the image. For example, arrow 517 may be the convolutional operation using the 2×2 convolutional filter, but the present disclosure is not limited thereto. Arrow 519 illustrated in FIG. 12 may mean a convolutional operation for transferring an output to a complete connection layer. For example, arrow 519 may be the convolutional operation using the 1×1 convolutional filter. In the illustration of FIG. 12, a rectangle with deviant crease lines included in the dimension increasing network 530 may mean the reception of information for increasing the dimension of the image from a corresponding layer of the dimension decreasing network 510.

The U network 500 may have a structure (arrow 513 illustrated in FIG. 12), in which information (for example, the location information about the pixel and a high-level feature) for increasing the dimension is transferred to a process of increasing the dimension of the image in a process of decreasing the dimension of the image for the image segmentation. That is, each layer of the dimension decreasing network 510 of the U network may transfer location information about the feature to a corresponding layer of the dimension increasing network 530. Accordingly, it is possible to restore the location information about the pixel, which may be lost during the process of decreasing the dimension of the image and then increasing the dimension of the image. Accordingly, the location information about the pixel may be restored during the process of increasing the dimension of the image, so that the U network may use the location information about the pixel in the essential image segmentation. Particularly, like the example illustrated in FIG. 12, a first layer (a layer closest to an input) in the dimension decreasing network 510 of the U network 500 may transfer information to the last layer (a layer closest to an output) of the dimension increasing network 530. The transferred information may include information required for increasing the dimension of the dimension decreased image by the dimension increasing network 530. The transferred information may be, for example, the feature, the location information about the feature, the location information about the pixel, at which each feature is extracted, and pixel location information of an original image, and the present disclosure is not limited thereto. Further, a second layer (the second layer from the input) in the dimension decreasing network of the U network may transfer information to the second layer from the last (the second layer from the output) of the dimension increasing network 530. During the process, each subnetwork (the dimension increasing network 530 and the dimension decreasing network 510) of the U network may transfer the information to the corresponding layer determined based on the location of the layer.

Figure 13:
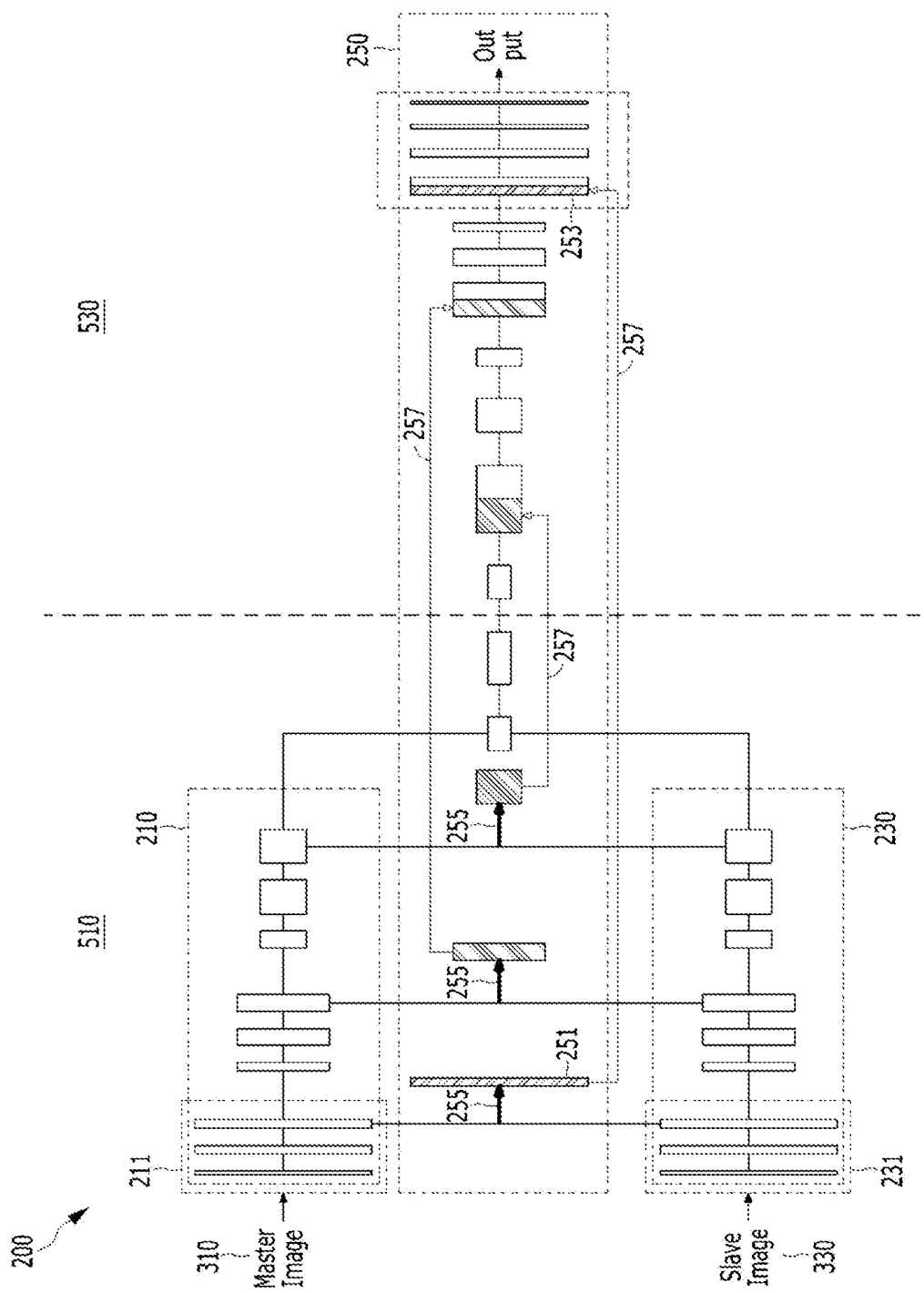
FIG. 13 is a diagram of an example of a Siamese network for implementing the image comparison method according to another exemplary embodiment of the present disclosure.

The comparison module 250 may include the dimension increasing network and form at least a part of the U network structure with at least one of the subnetworks 210 and 230. FIG. 13 is a diagram of an example of the Siamese network for implementing the image comparison method according to another exemplary embodiment of the present disclosure, and illustrates the case where the subnetworks 210 and 230 form the U network structure with the comparison module 250. In the example of FIG. 13, a rectangle of one group may represent one layer of the neural network. The neural network of FIG. 13 is simply a simplified example, and the number of layers, a size of an image, and the like may be changed, and the present disclosure is not limited to the description of FIG. 13.

In FIG. 13, a left side of a dotted line may form the dimension decreasing network 510, which decreases a dimension of input data, of the U network, and a right side of the dotted line may form the dimension increasing network 530, which restores the dimension of the input data.

In the example of FIG. 13, the master image 310 may be input to the first subnetwork 210, and the slave image 330 may be input to the second subnetwork 230. The first subnetwork 210 may extract a feature from the master image 310, and the second subnetwork 230 may extract a feature from the slave image 330. In this case, the first and second subnetworks 210 and 230 may share weights. The features of the layers of the first and second subnetworks 210 and 230 may be compared with each other. Arrow 255 illustrated in FIG. 13 may indicate an operation of drawing data from the first and second subnetworks. For example, arrow 255 may indicate an operation of comparing data calculated by the first and second subnetworks. Further, for example, arrow 255 may indicate an operation of calculating a difference between the feature of the master image and the feature of the slave image or comparing the feature of the master image and the feature of the slave image by the DNN. The feature extracted from the layer of each of the first and second subnetworks 210 and 230 may be compared by the comparison module 250. The processor 110 may compare the features extracted from the layer of each of the first and second subnetworks 210 and 230 and generate layer comparison information. The layer comparison information may include information about the difference between the feature of the master image and the feature of the slave image. The processor 110 may calculate anomaly related information based on the layer comparison information. To this end, the processor 110 may provide the generated layer comparison information and feature information to the corresponding layer of the comparison module 250. The provided information may be the feature, the location information about the feature, the location information about the pixel, at which each feature is extracted, the pixel location information about the original image, the layer comparison information, and the like. The corresponding layer is determined based on the location of the layer of the first subnetwork or the layer of the second subnetwork, which is the basis for generating the layer comparison information. More particularly, the layers close to the input layers of the first and second subnetworks correspond to the layer close to the output of the comparison module 250. A pattern illustrated in the rectangle in FIG. 13 may mean the layers corresponding to each other. That is, the first layers 211 and 231 of the first and second subnetworks illustrated in FIG. 13 may correspond to a third layer of the comparison module 250. That is, the location of the layer based on the input layers of the first and second subnetworks may correspond to the location of the layer based on the output layer of the comparison module 250. That is, first layer comparison information 251 illustrated in FIG. 13 may be transferred to a third layer 253 of the dimension increasing network 530 of the comparison module 250. Arrow 257 illustrated in FIG. 13 may indicate an operation of transferring the information drawn from the first and second subnetworks to the corresponding layer belonging to the dimension increasing network 530. Further, arrow 257 may mean the transfer of the information for increasing the dimension of the dimension decreased image. Arrow 257 means the transfer and the connection of the layer comparison information and the feature information, and is the similar operation to that of arrow 513 illustrated in FIG. 12 in relation to the U network. In the Siamese network of FIG. 13, the subnetworks (the subnetwork and the comparison module) of the Siamese network form the U network structure, so that it is possible to restore the location information about the pixel, which may be lost during the process of transmitting the layer comparison information 251 to the dimension increasing network 530 and decreasing and then increasing the dimension of the image. Accordingly, the image comparison method of the present disclosure has the neural network structure illustrated in FIG. 13, so that it is possible to perform the image segmentation on the anomaly portion.

In the present disclosure, the neural network 200 may determine whether the anomaly data is included in the slave image 330 based on the difference between the master image 310 and the slave image 330. Further, in the present disclosure, the neural network 200 may display the pixel of the anomaly portion existing in the slave image 330 based on the difference between the master image 310 and the slave image 330 and the layer comparison information.

The neural network including the application of the Siamese network is used, so that the image comparison method of the exemplary embodiment of the present disclosure may learn both the case where the master image is partially different from the slave image (the case where the two images are much similar, but anomaly partially exists, so that details are partially different, and the like) and the case where the master is much different from the slave image (the case where the two image are considerably different due to lens distortion, light change, texture difference, and the like, but the anomaly does not exist, so that details are similar, and the like) and classify the cases. The image comparison method of the present disclosure may determine whether anomaly data exists in the slave image by the difference in the detail when the master image and the slave image belong to the same domain. Particularly, when both the master image and the slave image are the images related to fabric including a flower pattern (the case where the patterns are the same and the textures are the same), different portions in the two images may be anomaly data. Further, the image comparison method of the present disclosure may compare the details even when the master image and the slave image belong to the different domains, and determine whether anomaly data exists in the slave image. Particularly, when the master image is an image related to fabric including a flower pattern and the slave image is an image related to leather including a star pattern (the case where the patterns are different and the textures are different), the image comparison method may ignore a large difference portion in the two images generated due to the different domains and determine whether anomaly data exists in the slave image by examining the details. Accordingly, the image comparison method of the present disclosure may have general recognition performance despite a rotation and transformation of image data, an error by lens distortion, the domain change, and the like, thereby having an effect in that training data is secured for each domain and a limit of the existing neural network, in which learning needs to be performed for each domain, is overcome.

Figure 14:
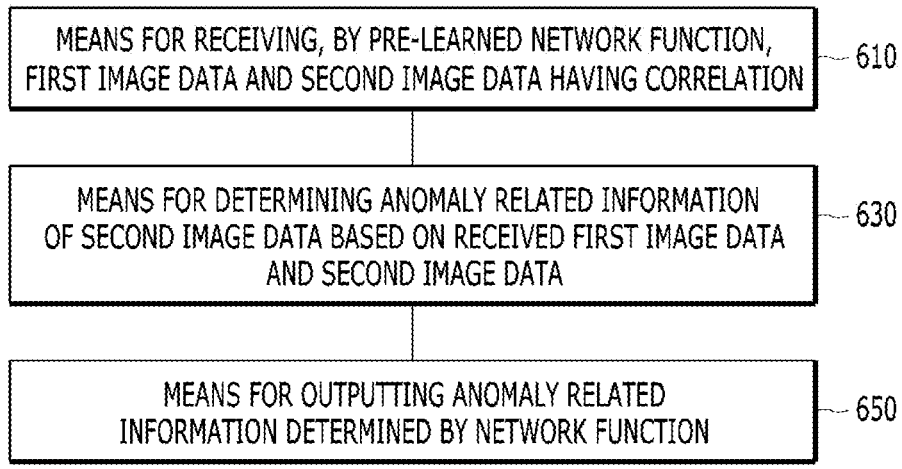
FIG. 14 is a block diagram illustrating means for implementing the image comparison method according to the exemplary embodiment of the present disclosure.

FIG. 14 is a block diagram illustrating means for implementing the image comparison method according to the exemplary embodiment of the present disclosure.

The image comparison method according to the exemplary embodiment of the present disclosure may be implemented by the means described below.

The image comparison method according to the exemplary embodiment of the present disclosure may be implemented by a means 610 for receiving, by a pre-learned network function, first image data and second image data having correlation; a means 630 for determining anomaly related information about the second image data based on the received first image data and second image data; and a means 650 for outputting the anomaly related information determined by the network function.

In an alternative exemplary embodiment, the network function may include a first subnetwork, to which the first image data is input, and a second subnetwork, to which the second image data is input.

In the alternative exemplary embodiment, the network function may further include a comparison module, which is connected with at least one of the first subnetwork and the second subnetwork in series.

In the alternative exemplary embodiment, at least one of the first subnetworks, the second subnetwork, and the comparison module may have a DNN structure.

In the alternative exemplary embodiment, at least one of the first subnetwork and the second subnetwork may have a CNN structure among the DNN structures.

In the alternative exemplary embodiment, the comparison module may have a DCNN structure among the DNN structures.

In the alternative exemplary embodiment, the comparison module may form at least a part of a U network (U-net) structure with at least one of the first subnetwork and the second subnetwork.

In the alternative exemplary embodiment, the first subnetwork and the second subnetwork may share one or more links having the same weight.

In the alternative exemplary embodiment, the first subnetwork and the second subnetwork may form at least a part of the Siamese network.

In the alternative exemplary embodiment, the means 630 for determining the anomaly related information may include: a means for generating at least one element of layer comparison information based on at least one layer of the first subnetwork and at least one layer of the second subnetwork; and a means for calculating the anomaly related information based on the generated layer comparison information.

In the alternative exemplary embodiment, the means for calculating the anomaly related information may include a means for providing a corresponding layer of the comparison module with the generated layer comparison information.

In the alternative exemplary embodiment, the corresponding layer may be determined based on a location of the layer of the first subnetwork or the layer of the second subnetwork, which is the basis for generating the layer comparison information.

In the alternative exemplary embodiment, the first image data may be a master image including only normal state image data including no anomaly data, and the second image data may be a slave image.

In the alternative exemplary embodiment, the anomaly related information may include data related to location information about a pixel, at which anomaly exists, in the second image data.

In the alternative exemplary embodiment, the first image data and the second image data may have the same size.

Figure 15:
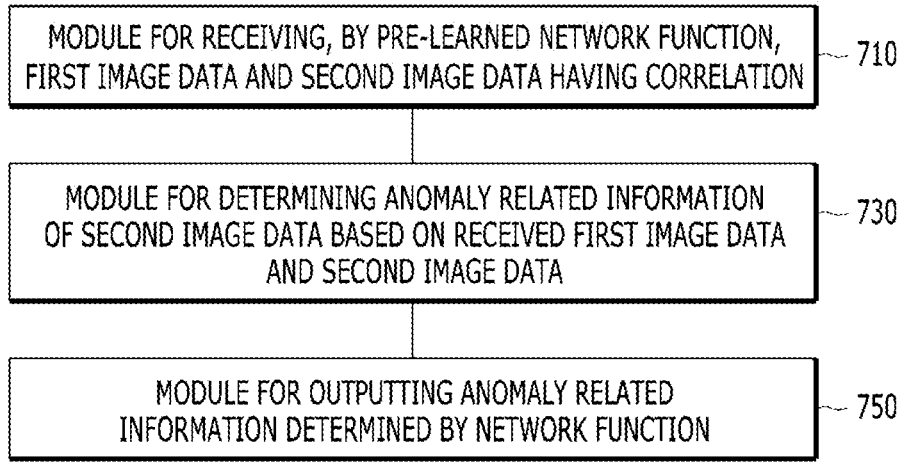
FIG. 15 is a block diagram illustrating a module for implementing the image comparison method according to the exemplary embodiment of the present disclosure.

FIG. 15 is a block diagram illustrating a module for implementing the image comparison method according to the exemplary embodiment of the present disclosure.

The image comparison method according to the exemplary embodiment of the present disclosure may be implemented by modules described below.

The image comparison method according to the exemplary embodiment of the present disclosure may be implemented by a module 710 for receiving, by a pre-learned network function, first image data and second image data having correlation; a module 730 for determining anomaly related information about the second image data based on the received first image data and second image data; and a module 750 for outputting the anomaly related information determined by the network function.

In the alternative exemplary embodiment, the module 730 for determining the anomaly related information may include: a module for generating at least one element of layer comparison information based on at least one layer of the first subnetwork and at least one layer of the second subnetwork; and a module for calculating the anomaly related information based on the generated layer comparison information.

In the alternative exemplary embodiment, the module for calculating the anomaly related information may include a module for providing a corresponding layer of the comparison module with the generated layer comparison information.

Figure 16:
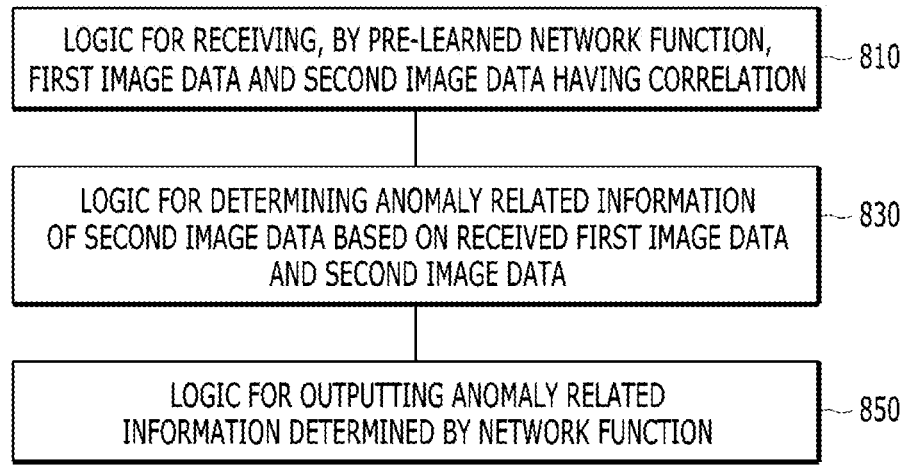
FIG. 16 is a block diagram illustrating logic for implementing the image comparison method according to the exemplary embodiment of the present disclosure.

FIG. 16 is a block diagram illustrating logic for implementing the image comparison method according to the exemplary embodiment of the present disclosure.

The image comparison method according to the exemplary embodiment of the present disclosure may be implemented by logic described below.

The image comparison method according to the exemplary embodiment of the present disclosure may be implemented by logic 810 for receiving, by a pre-learned network function, first image data and second image data having correlation; logic 830 for determining anomaly related information about the second image data based on the received first image data and second image data; and logic 850 for outputting the anomaly related information determined by the network function.

In the alternative exemplary embodiment, the logic 830 for determining the anomaly related information may further include: logic for generating at least one element of layer comparison information based on at least one layer of the first subnetwork and at least one layer of the second subnetwork; and logic for calculating the anomaly related information based on the generated layer comparison information.

In the alternative exemplary embodiment, the logic for calculating the anomaly related information may include logic for providing a corresponding layer of the comparison module with the generated layer comparison information.

Figure 17:
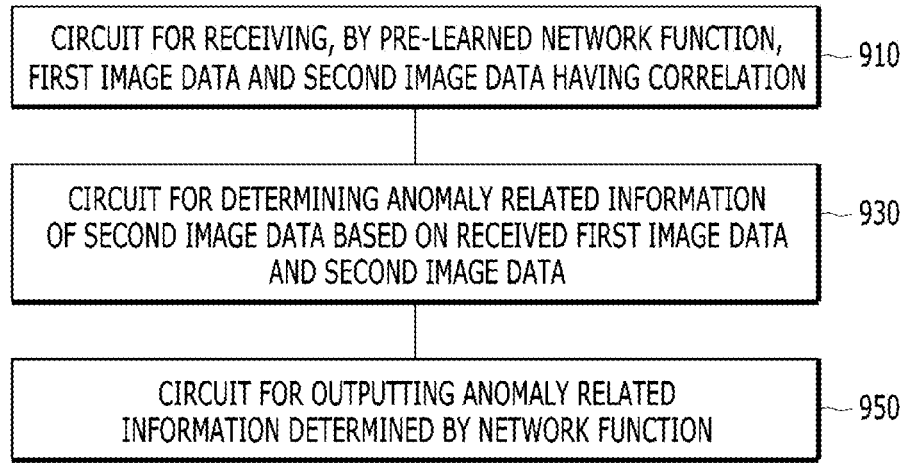
FIG. 17 is a block diagram illustrating a circuit for implementing the image comparison method according to the exemplary embodiment of the present disclosure.

FIG. 17 is a block diagram illustrating a circuit for implementing the image comparison method according to the exemplary embodiment of the present disclosure.

The image comparison method according to the exemplary embodiment of the present disclosure may be implemented by the circuits described below.

The image comparison method according to the exemplary embodiment of the present disclosure may be implemented by a circuit 910 for receiving, by a pre-learned network function, first image data and second image data having correlation; a circuit 930 for determining anomaly related information about the second image data based on the received first image data and second image data; and a circuit 950 for outputting the anomaly related information determined by the network function.

In the alternative exemplary embodiment, the circuit 930 for determining the anomaly related information may further include: a circuit for generating at least one element of layer comparison information based on at least one layer of the first subnetwork and at least one layer of the second subnetwork; and a circuit for calculating the anomaly related information based on the generated layer comparison information.

In the alternative exemplary embodiment, the circuit for calculating the anomaly related information may include a circuit for providing a corresponding layer of the comparison module with the generated layer comparison information.

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative component, blocks, configurations, means, logic, modules, circuits, and operations have been generally described above in the functional aspects thereof. Whether the functionality is implemented by hardware or software depends on a specific application or design restraints given to the general system. Those skilled in the art may implement the functionality described by various methods for each of the specific applications, but it shall not be construed that the determinations of the implementation deviate from the range of the contents of the present disclosure.

Figure 18:
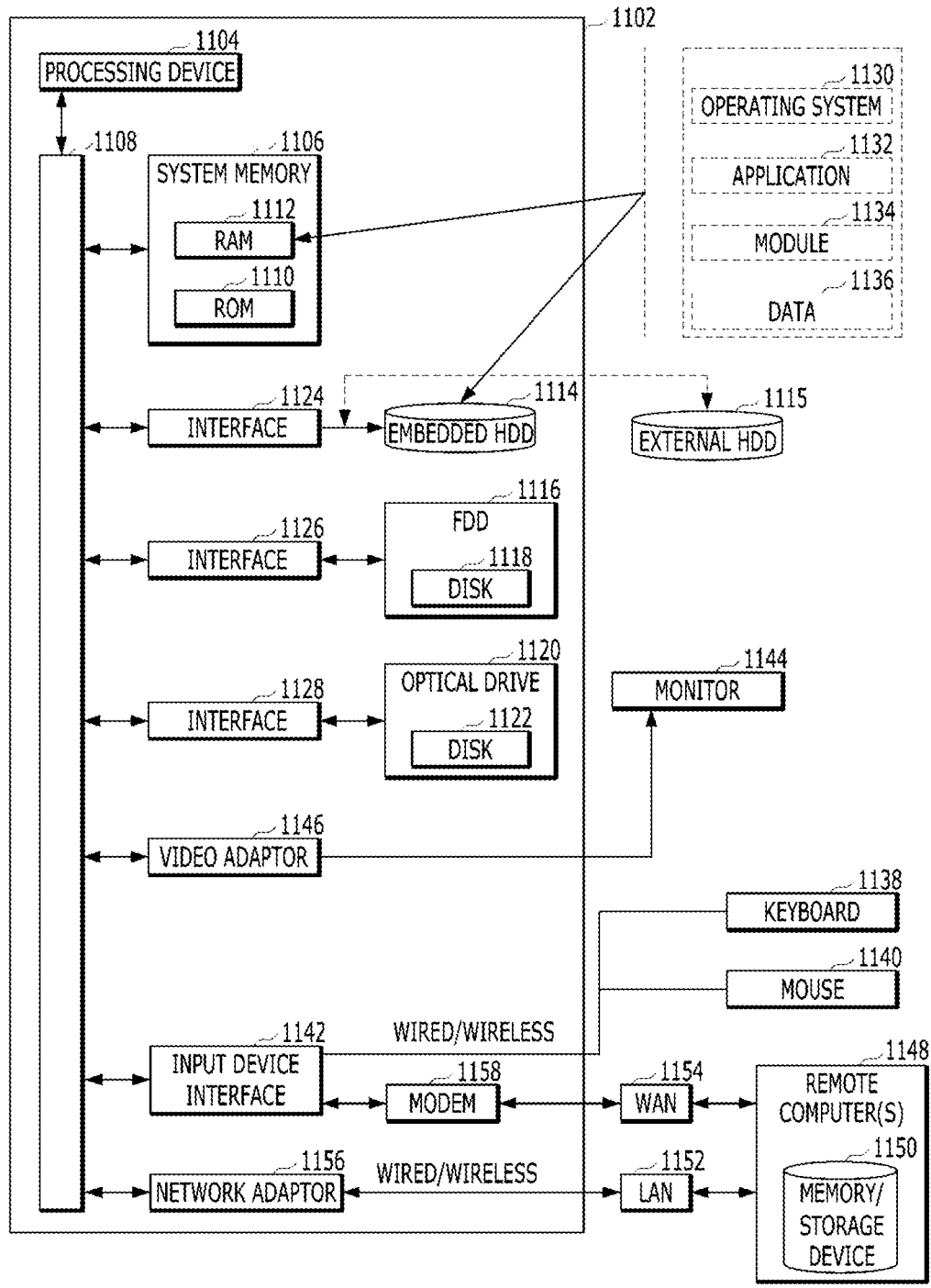
FIG. 18 is a block diagram illustrating a computing device according to an exemplary embodiment of the present disclosure.

FIG. 18 is a block diagram illustrating a computing device according to an exemplary embodiment of the present disclosure.

FIG. 18 is a simple and general schematic diagram of an example of a computing environment, in which the exemplary embodiments of the present disclosure may be implemented.

The present disclosure has been generally described in relation to a computer executable command executable in one or more computers, but those skilled in the art will appreciate well that the present disclosure may be implemented in combination with other program modules and/or in a combination of hardware and software.

In general, a program module includes a routine, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable media. A computer accessible medium may be a computer readable medium regardless of the kind of medium, and the computer readable medium includes volatile and non-volatile media, transitory and non-non-transitory media, and portable and non-portable media. As a non-limited example, the computer readable medium may include a computer readable storage medium and a computer readable transport medium. The computer readable storage medium includes volatile and non-volatile media, transitory and non-non-transitory media, and portable and non-portable media constructed by a predetermined method or technology, which stores information, such as a computer readable command, a data structure, a program module, or other data. The computer storage medium includes a read only memory (RAM), a read only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various common processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routine helping a transport of information among the constituent elements within the computer 1102 at a time, such as starting. The RAM 2112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 may be configured for outer mounted usage within a proper chassis (not illustrated), a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable media, the HDD, the portable magnetic disk, and the portable optical media, such as a CD, or a DVD, are mentioned, but those skilled in the art will appreciate well that other types of compute readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated well that the present disclosure may be implemented by several commercially available operating systems or a combination of the operating systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adapter 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a workstation, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adapter 1156. The adapter 1156 may make wired or wireless communication to the LAN 1152 easy, and the LAN 1152 may also include a wireless access point installed therein for the communication with the wireless adapter 1156. When the computer 1102 is used in the WAN networking environment, the computer 1102 may include a modem 1158, or includes other means connected to a communication computing device in the WAN 1154 or setting communication through the WAN 1154 via the Internet and the like. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electromagnetic fields or particles, optical fields or particles, or a predetermined combination thereof.

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

Mode for Carrying Out the Disclosure

Related contents have been described above in the best mode for carrying out the present disclosure.

INDUSTRIAL APPLICABILITY

The present disclosure may be used for training an artificial neural network utilized in a field of comparing an input image by using a computing device.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of comparing an image, the method comprising:
    calculating, by one or more processors, a first image data which is a master image including only normal state image data without anomaly data using a first subnetwork included in a network function;
    calculating, by the one or more processors, a second image data which is a slave image corresponding to a determination of an anomaly using a second subnetwork included in the network function;
    determining, by the one or more processors, anomaly related information of the second image data based on a calculation result of the first image data and the second image data of the network function; and
    outputting, by the one or more processors, the anomaly related information determined by the network function.

2. The method of claim 1, wherein the network function further includes a comparison module, which is connected with at least one of the first subnetwork and the second subnetwork in series.

3. The method of claim 2, wherein at least one of the first subnetwork, the second subnetwork, and the comparison module has a deep neural network (DNN) structure.

4. The method of claim 3, wherein at least one of the first subnetwork and the second subnetwork has a convolutional neural network (CNN) structure among the DNN structures.

5. The method of claim 3, wherein the comparison module has a deconvolutional neural network (DCNN) structure among the DNN structures.

6. The method of claim 2, wherein the comparison module forms at least a part of a U network (U-net) structure with at least one of the first subnetwork and the second subnetwork.

7. The method of claim 2, wherein the first subnetwork and the second subnetwork share one or more links having a same weight.

8. The method of claim 7, wherein the first subnetwork and the second subnetwork form at least a part of a Siamese network.

9. The method of claim 2, wherein the determining of the anomaly related information includes:
    generating, by one or more processors, at least one layer comparison information based on at least one layer of the first subnetwork and at least one layer of the second subnetwork; and
    calculating, by the one or more processors, the anomaly related information based on the generated layer comparison information.

10. The method of claim 9, wherein the calculating of the anomaly related information includes providing, by the one or more processors, a corresponding layer of the comparison module with the generated layer comparison information.

11. The method of claim 10, wherein the corresponding layer is determined based on a location of the layer of the first subnetwork or the layer of the second subnetwork, which is the basis for generating the layer comparison information.

12. The method of claim 1, wherein the anomaly related information includes data related to location information about a pixel, at which the anomaly exists, in the second image data.

13. The method of claim 1, wherein the first image data and the second image data have a same size.

14. A computing device, comprising:
    one or more processors; and
    a memory to store instructions executable by the one or more processors;
    wherein the one or more processors are configured to:
        calculate a first image data which is a master image including only normal state image data without anomaly data using a first subnetwork included in a network function;
        calculate a second image data which is a slave image corresponding to a determination of an anomaly using a second subnetwork included in the network function;
        determine anomaly related information of the second image data based on a calculation result of the first image data and the second image data of the network function; and
        output the anomaly related information determined by the network function.

15. A non-transitory computer-readable storage medium storing a computer program including encoded instructions, the computer program being executable by one or more processors of a computing device to cause the one or more processors to perform operations for image comparison, the operations comprising:
    calculating, by the one or more processors, a first image data which is a master image including only normal state image data without anomaly data using a first subnetwork included in a network function;
    calculating, by the one or more processors, a second image data which is a slave image corresponding to a determination of an anomaly using a second subnetwork included in the network function;
    determining, by the one or more processors, anomaly related information of the second image data based on a calculation result of the first image data and the second image data of the network function; and
    outputting, by one or more processors, the anomaly related information determined by the network function.

* * * * *